(12) United States Patent
Yin et al.

(10) Patent No.: US 10,212,072 B2
(45) Date of Patent: Feb. 19, 2019

(54) PEER STATE SYNCHRONIZATION MECHANISM FOR DYNAMIC NETWORK ADDRESS TRANSLATION (DNAT) IN A NETWORK ELEMENT

(71) Applicant: Arista Networks, Inc., Santa Clara, CA (US)

(72) Inventors: Jikai Yin, San Jose, CA (US); Sudip Regmi, Fremont, CA (US); Suresh Kumar Nalagatla, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 245 days.

(21) Appl. No.: 15/182,099

(22) Filed: Jun. 14, 2016

(65) Prior Publication Data

US 2017/0359305 A1 Dec. 14, 2017

(51) Int. Cl.
| | |
|---|---|
| *H04L 29/12* | (2006.01) |
| *H04L 12/24* | (2006.01) |
| *H04L 12/721* | (2013.01) |
| *H04L 12/703* | (2013.01) |
| *H04L 12/755* | (2013.01) |
| *H04L 12/749* | (2013.01) |
| *H04L 12/931* | (2013.01) |
| *G06F 21/00* | (2013.01) |

(52) U.S. Cl.
CPC .......... *H04L 45/28* (2013.01); *H04L 41/0663* (2013.01); *H04L 45/021* (2013.01); *H04L 45/741* (2013.01); *H04L 49/602* (2013.01); *H04L 61/255* (2013.01); *H04L 61/2514* (2013.01); *H04L 41/0672* (2013.01)

(58) Field of Classification Search
USPC ................................ 709/221, 235, 217, 213
See application file for complete search history.

(56) References Cited

U.S. PATENT DOCUMENTS

| | | | |
|---|---|---|---|
| 6,608,830 B1 * | 8/2003 | Hirano | H04L 12/4612 370/351 |
| 2004/0100976 A1 * | 5/2004 | Chang | H04L 29/12066 370/401 |
| 2006/0215684 A1 * | 9/2006 | Capone | H04L 63/029 370/437 |
| 2009/0144441 A1 * | 6/2009 | LoGalbo | H04L 65/4046 709/235 |

(Continued)

*Primary Examiner* — Jude Jean Gilles
(74) *Attorney, Agent, or Firm* — Chamberlain, Hrdlicka, White, Williams & Aughtry

(57) ABSTRACT

In general, embodiments of the invention relate to a method and system for enabling a peer state synchronization mechanism for dynamic network address translation (DNAT). More specifically, at least two network elements may be permitted to mount each other's DNAT tables, thereby providing redundancy for the implementation of DNATs in case of the failover of one of the network elements. The failed network element may then re-initialize while the functional network element continues to process packets, including packets that have been redirected to the functional network element post-failure of the failed network element. Upon completing re-initialization, the once failed network element recovers its DNAT table from the functional network element and proceeds to process packets normally.

20 Claims, 13 Drawing Sheets

(56) References Cited

U.S. PATENT DOCUMENTS

| | | | | |
|---|---|---|---|---|
| 2013/0007190 A1* | 1/2013 | Kumar | ................ | H04L 61/2567 |
| | | | | 709/217 |
| 2016/0105471 A1* | 4/2016 | Nunes | ................ | H04L 12/4633 |
| | | | | 709/228 |
| 2017/0208002 A1* | 7/2017 | Bittles | .................... | H04L 45/72 |
| 2017/0359305 A1* | 12/2017 | Yin | ........................ | H04L 45/28 |

* cited by examiner

PEER STATE SYNCHRONIZATION MECHANISM FOR DYNAMIC NETWORK ADDRESS TRANSLATION (DNAT) IN A NETWORK ELEMENT

BACKGROUND

Redundant pair deployments for network elements implementing dynamic network address translations (DNATs) are needed.

SUMMARY

In general, in one aspect, embodiments of the invention relate to a method for processing packets. The method includes maintaining, by a network element, a peer dynamic network address translation (DNAT) table associated with a peer network element, detecting that the peer network element has failed, merging, in response to the detecting, the peer DNAT table into a local DNAT table to obtain a merged DNAT table, and processing an incoming packet using the merged DNAT table.

In general, in one aspect, embodiments of the invention relate to a network element. The network element includes a control plane comprising a system state database (SSD) and a network address translation (NAT) agent, wherein the SSD and the NAT agent are operatively connected, wherein the NAT agent is programmed to maintain, on the SSD, a peer dynamic network address translation (DNAT) table associated with a peer network element, detect that the peer network element has failed, merge, in response to the detecting, the peer DNAT table into a local DNAT table to obtain a merged DNAT table, and process an incoming packet using the merged DNAT table.

In general, in one aspect, embodiments of the invention relate to a non-transitory computer readable medium comprising computer readable program code, which when executed by a processor enables the processor to perform a method, the method comprising maintaining, by a network element, a peer dynamic network address translation (DNAT) table associated with a peer network element, detecting that the peer network element has failed, merging, in response to the detecting, the peer DNAT table into a local DNAT table to obtain a merged DNAT table, and processing an incoming packet using the merged DNAT table.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for enabling a peer state synchronization mechanism for dynamic network address translation (DNAT). More specifically, embodiments of the invention permit at least two network elements to mount each other's DNAT tables, thereby providing redundancy for the implementation of DNATs in case of the failover of one of the network elements. The failed network element may then re-initialize while the functional network element continues to process packets, including packets that have been redirected to the functional network element post-failure of the failed network element. Upon completing re-initialization, the once failed network element recovers its DNAT table from the functional network element and proceeds to process packets normally.

Figure 1:
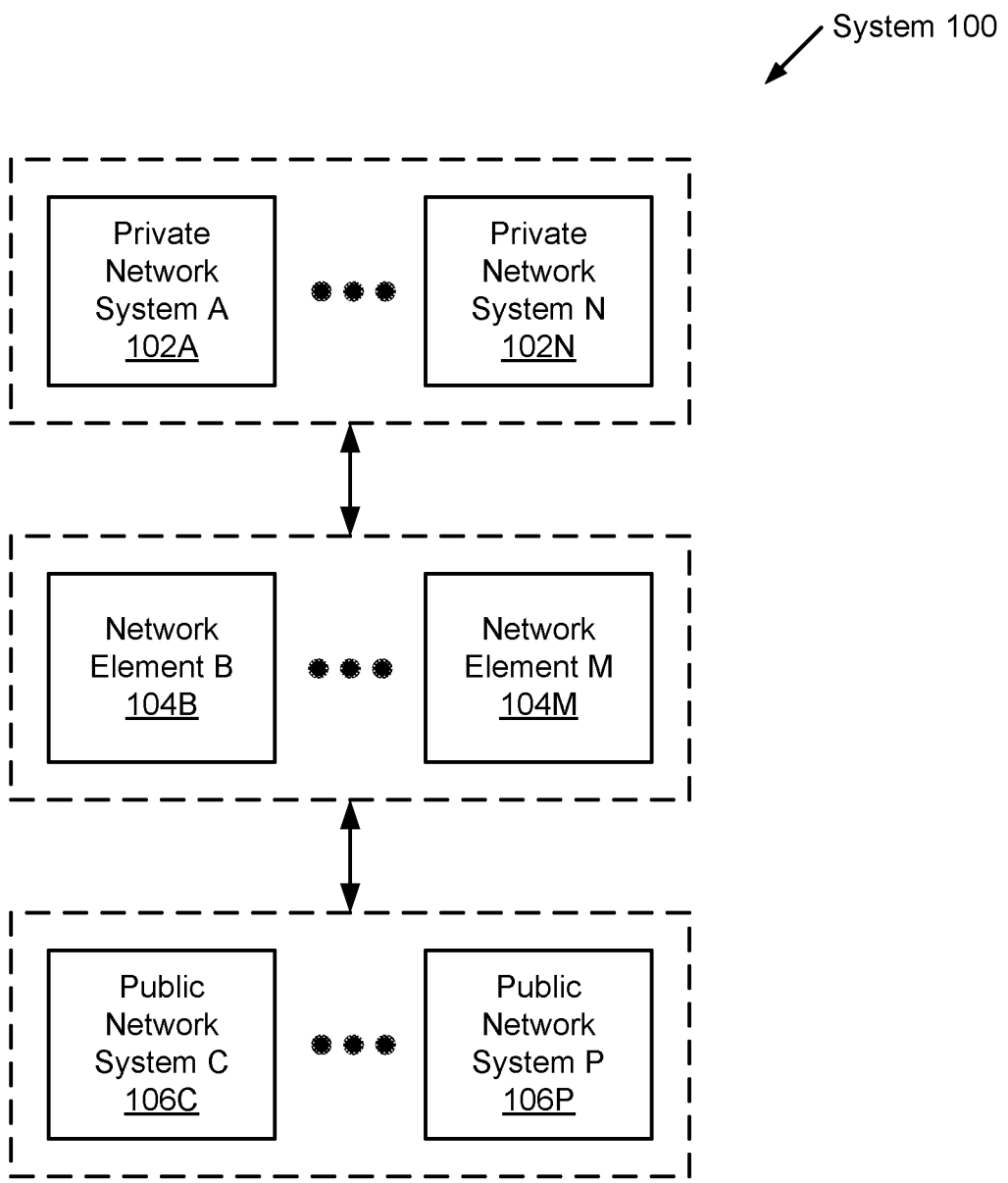
FIG. 1 shows a system in accordance with one or more embodiments of the invention.

FIG. 1 shows a system in accordance with one or more embodiments of the invention. The system (100) includes one or more private network systems (102A, 102N) operatively connected to two or more network elements (104B, 104M), which in turn are operatively connected to one or more public network systems (106C, 106P). Each of these components is described below.

In one embodiment of the invention, the aforementioned components may be directly or indirectly connected to each other using any combination of wired or wireless communications. In embodiments in which the aforementioned components are indirectly connected to one another, there may be other network infrastructure components or systems (e.g., network elements, servers, etc.) (not shown) that facilitate communication between the aforementioned components. The aforementioned components may communicate with each other using any combination of wired and/or wireless communication protocols.

In one embodiment of the invention, a private network system (102A, 102N) may be any type of computing system (see e.g., FIG. 9) that makes up part of a private network. In one embodiment of the invention, a private network may be a local area network (LAN) (e.g., a network of interconnected computing systems) that utilizes private routing, or Internet Protocol (IP), addresses. In one embodiment of the invention, a private network system includes functionality to: (i) receive and transmit packets (e.g., media access control (MAC) frames) from/to public network systems (106C, 106P) via the two or more network elements (104B, 104M); and (ii) receive and transmit packets from/to other computing systems in the private network. By way of an example, a private network system may be a desktop computer or server within a home, office, or enterprise LAN.

In one embodiment of the invention, a network element (104B, 104M) is a physical device that includes persistent storage, memory (e.g., random access memory (RAM)), one or more processors (e.g., integrated circuits) (including a switch chip), and two or more physical ports. Examples of a network element may include, but are not limited to, a switch, a router, a multilayer switch, or any other physical device programmed to implement one or more network communication protocols. In one embodiment of the invention, the switch chip is hardware that determines which egress port on a switch to forward bridging packets (e.g., media access control (MAC) frames). The switch chip may include egress and ingress ports that may connect to ports on the network element. Each port may or may not be connected to another network infrastructure component (e.g., another network element, a server, etc.) on a network. The network element (104B, 104M) may be programmed to receive packets via the ports and determine whether to (i) drop the packet, (ii) process the packet in accordance with one or more embodiments of the invention, and/or (iii) send the packet, based on the processing, out another port of the network element.

How the network element makes the determination of whether to drop the packet, and/or send the packet to another network infrastructure component (e.g., a network element, a server, etc.) on the network depends, in part, on whether the network element is a layer-2 (L2) switch or a layer-3 (L3) switch (also referred to as a multilayer switch), which may perform at least some functions of a router. If the network element is operating as a L2 switch, the network element uses a destination bridging address (e.g., a destination MAC address) along with a forwarding table to determine out of which port to send the packet. If the network element is operating as a L3 switch, the network element uses a destination routing address (e.g., a destination Internet Protocol (IP) address) along with a routing table to determine out of which port to send the packet, and includes the ability to write the bridging address of the next network element to receive the packet in place of its own bridging address (which the last network element to send the packet wrote) in the L2 information encapsulating the packet. If the network element is a multilayer switch, the multilayer switch includes functionality to process packets using both bridging (e.g., MAC) and routing (e.g., IP) addresses.

The persistent storage in the network element may include any type of non-transitory computer readable medium that includes instructions, which when executed by one or more processors in the network element, enable the network element to perform the functions described in accordance with one or more embodiments of the invention (see e.g., FIGS. 4-7). Additional details about the network element are described below with respect to FIG. 2.

In one embodiment of the invention, a public network system (106C, 106P) may be any type of computing system (see e.g., FIG. 9) that has been assigned a globally unique public routing, or IP, address. This public routing address enables the public network system to be directly accessible over the Internet. In one embodiment of the invention, a public network system may be a server, which is also referred to as a host. In one embodiment of the invention, the server may include functionality to generate, send, receive, and/or process bridging packets (e.g., MAC frames) either locally or over a network using software and computer hardware. Examples of types of servers include, but are not limited to, virtualized servers, database servers, dynamic host configuration protocol (DHCP) servers, application servers, file servers, print servers, and mail servers.

The invention is not limited to the system shown in FIG. 1.

Figure 2:
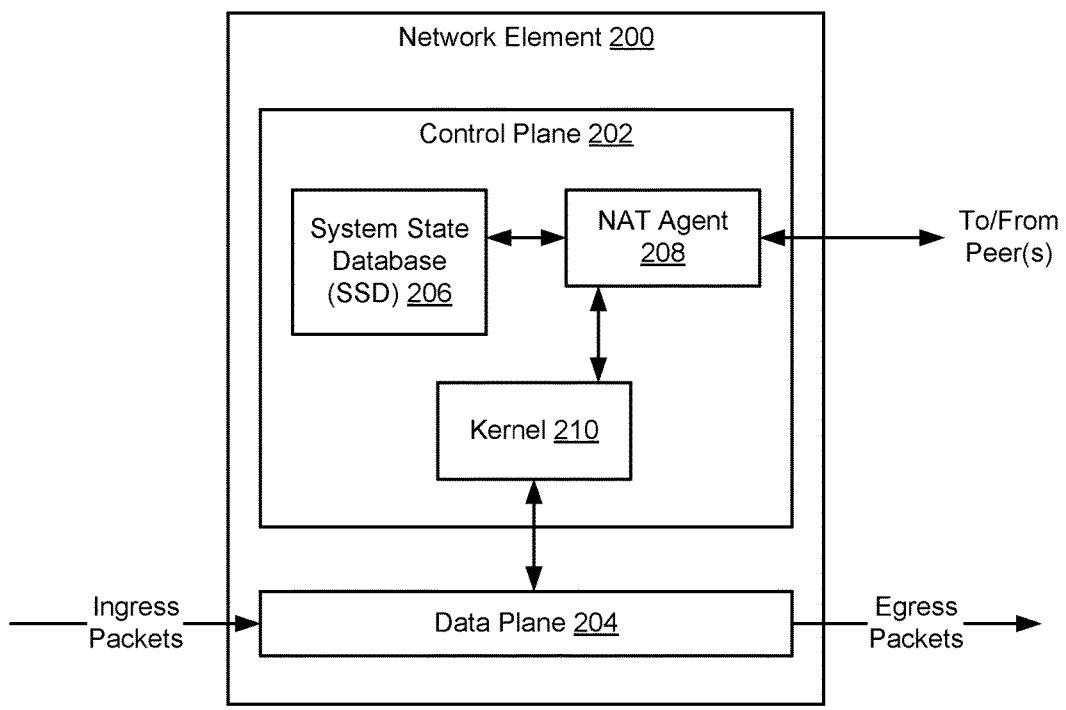
FIG. 2 shows a network element in accordance with one or more embodiments of the invention.

FIG. 2 shows a network element in accordance with one or more embodiments of the invention. The network element (200) includes a control plane (202) and a data plane (204). Each of these components is described below.

In one embodiment of the invention, the control plane (202) is a portion of the architecture employed in a network element (200). The control plane may be implemented using hardware, software, firmware, and/or any combination thereof. In one embodiment of the invention, the control plane includes functionality to manage the overall operation of the network element. More specifically, the control plane includes functionality to manage the operation of the data plane (204) (including the programming of the forwarding table (not shown)).

In one embodiment of the invention, the control plane (202) includes a system state database (SSD) (206). The SSD may be implemented using any combination of shared and non-shared memory. In one embodiment of the invention, the SSD stores the current state of the network element (e.g., all values in all data structures used by any of the network element agents (e.g., the network address translation (NAT) agent), which may be stored in the SSD). The SSD may include the values of all variables and/or parameters that are currently specified in the network element (200). In one embodiment of the invention, the SSD stores the aforementioned information in records within the SSD. The specific content of the records in the SSD may vary based on the implementation of the invention. Accordingly, a record within the SSD may include all, some, or none of the following: (i) the name of the variable (or name of the parameter); (ii) the current value of the variable (or parameter); and (iii) a timestamp indicating when the record was created (or last modified). Additionally, the SSD (206) may store other and/or different information about the current state of the network element (and/or the current state of one or more peer network elements) without departing from the invention. While the SSD in FIG. 2 is shown as a single entity, in other embodiments of the invention, various portions of the SSD may be stored in different locations within the network element (200).

In one embodiment of the invention, the control plane (202) includes one or more network element agents (not shown), such as the network address translation (NAT) agent (208). In one embodiment of the invention, each network element agent implements one or more protocols, processes, and/or services of the network element (200). Examples of other network element agents found within the control plane include, but are not limited to, a command line interface (CLI) agent, a routing information base (RIB) agent, a forwarding information base (FIB) agent, and a simple network management protocol (SNMP) agent. In one embodiment of the invention, each network element agent includes functionality to access various portions of the SSD (206) in order to obtain relevant portions of the state of the network element in order to perform various functions. In addition, each network element agent includes functionality to update the state of the network element by writing new and/or updated values in the SSD.

In one embodiment of the invention, the NAT agent (208) includes functionality to perform embodiments of the invention (see e.g., FIGS. 4-7) in order to enact a peer state synchronization mechanism for dynamic network address translation (DNAT). Accordingly, the NAT agent includes functionality to: (i) obtain, from the SSD (206), and share a local DNAT table with one or more peer network elements; (ii) receive and maintain, on the SSD, one or more peer DNAT tables from one or more peer network elements; (iii) provide local and peer DNAT state to the kernel (210); (iv) implement normal NAT packet processing for the transmission of ingress packets to their appropriate destinations; (v) detect that a peer network element has failed; (vi) merge a peer DNAT table into the local DNAT table upon the detection of a peer's failure; and (vii) implement a recovery process to return the network element to normal functionality (see e.g., FIG. 7). The NAT agent may be responsible for additional and/or alternative functionalities without departing from the invention.

In one embodiment of the invention, the control plane (202) includes a kernel (210). The kernel may be a computer program (e.g., a portion of an operating system) that includes functionality to manage, at least in part, access to hardware resources of the network element (200) by non-kernel resources (e.g., the NAT agent (208)). As such, the kernel (210) includes further functionality to: (i) receive DNAT state from the NAT agent; and (ii) program hardware of the network element to process and forward packets based on the received DNAT state. The kernel may enact additional and/or alternative functionalities of the network element without departing from the invention.

In one embodiment of the invention, the data plane (204) is another portion of the architecture employed in the network element (200). The data plane may be implemented using hardware, software, firmware, and/or any combination thereof. In one embodiment of the invention, the data plane includes functionality to receive packets (denoted as ingress packets) via ports (not shown), process the packets, and, as appropriate, transmit packets (denoted as egress packets) via the ports towards a destination. In one embodiment of the invention, the data plane (204) may interface with the kernel (210) in order to receive programming consistent with embodiments of the invention (such as mappings corresponding to DNAT state, which determines how packets are to be processed and forwarded). In one embodiment of the invention, the data plane (204) may also include functionality to gather data plane information and to provide this data plane information to the control plane (202). In one embodiment of the invention, data plane information includes, but is not limited to, network usage data, flow information based on the sampling of packets received by the data plane, information related to queue depths on ingress and egress buffers (not shown) in the data plane, and other data traffic statistics. Additional and/or alternative data plane information may be provided and/or exist without departing from the invention.

Figure 3A:
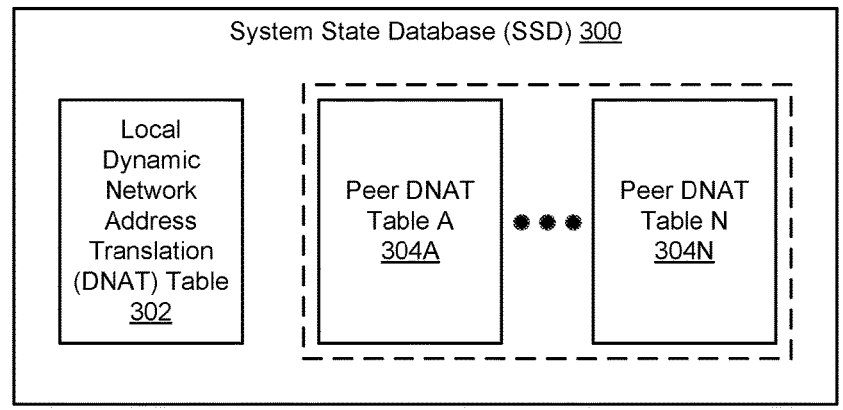
FIG. 3A shows a system state database (SSD) in accordance with one or more embodiments of the invention.

FIG. 3A shows a system state database (SSD) in accordance with one or more embodiments of the invention. As discussed above, the SSD (300) stores the current state of the network element, including the local dynamic network address translation (DNAT) table (302). Upon enabling of the synchronization of peer state (discussed below) in accordance with embodiments of the invention, the SSD may further store, and maintain, one or more peer DNAT tables (304A, 304N), which are associated with one or more peer network elements. Peer DNAT tables are maintained as a redundancy measure in case a peer network element fails. Further, in one embodiment of the invention, in merging with a peer DNAT table upon the failure of a peer network element, a network element may continue to route/forward packets that had once relied on the peer network element to reach their destinations. Subsequently, packet losses and the probability of the eventual reset of the transmission control protocol (TCP) session are minimized.

Additional and/or alternative state information pertinent to embodiments of the invention may be included in the SSD (300). By way of one example, the SSD may further store/maintain a pool of available public IP addresses (not shown). In one embodiment of the invention, this pool of public IP addresses may be assigned dynamically, by the network element, to private network systems that which require public Internet connectivity in order to request and receive resources from public network systems. Additionally, this pool of available public IP addresses may be reserved for use by computing systems of a private network by an Internet Service Provider (ISP). In one embodiment of the invention, the number of available public IP addresses in the pool may be much smaller than the number of private network systems deployed in a private network. By way of another example, the SSD (300) may also include state information representative of port ranges (not shown) that identify which ports of the network element are connected to private network systems, public network systems, and/or other peer network elements.

Figure 3B:
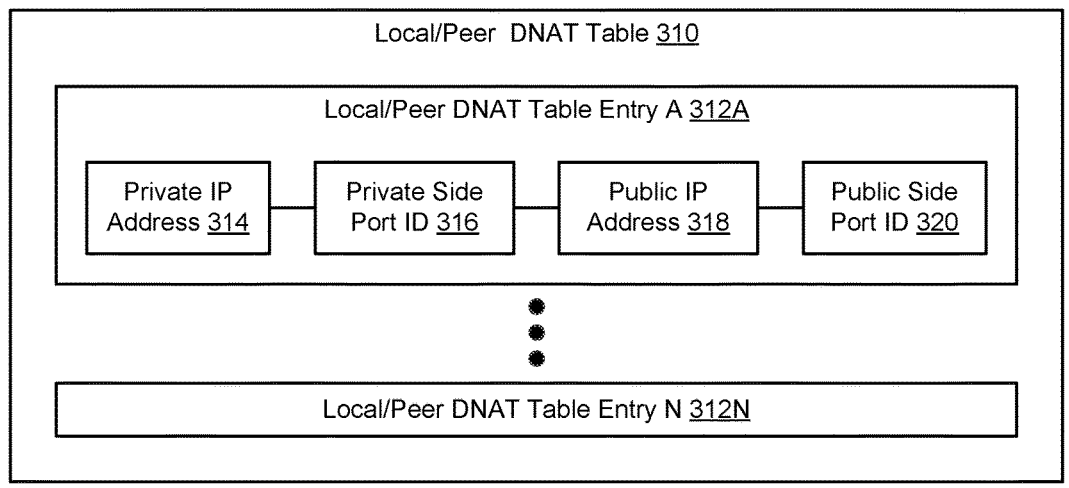
FIG. 3B shows a dynamic network address translation (DNAT) table in accordance with one or more embodiments of the invention.

FIG. 3B shows a dynamic network address translation (DNAT) table in accordance with one or more embodiments of the invention. A DNAT table (310) may be implemented in hardware, software, or any combination thereof. Moreover, the DNAT table may be a database (or any other data structure) that includes entries, which specify mappings between one IP address space (e.g., a private network) into another (e.g., the Internet). In one embodiment of the invention, these mappings may be used to track and facilitate communications (or the exchange of resources) between a private network system and a public network system (see e.g., FIG. 1). As such, a DNAT table (310) includes one or more DNAT table entries (312A, 312N). In one embodiment of the invention, a DNAT table entry may be programmed by the network address translation (NAT) agent on the network element (see e.g., FIG. 2).

In one embodiment of the invention, each of the one or more DNAT table entries (312A, 312N) includes a private Internet Protocol (IP) address (314). The private IP address may correspond to a private network system, of the one or more private network systems in a private network, that may be requesting a resource from a public network system (e.g., a server). In one embodiment of the invention, these private IP addresses are not considered routable on the public Internet and, thus, are intended to uniquely identify computing systems (and/or virtual machines executing on these computing systems) within a private network (or intranet). Following the IP Version 4 (IPv4) architecture, for example, there are three address ranges designated for private networks. These ranges include IP addresses from: (i) 10.0.0.0 to 10.255.255.255; (ii) 172.16.0.0 to 172.31.255.255; and (iii) 192.168.0.0 to 192.168.255.255.

In one embodiment of the invention, each of the one or more DNAT table entries (312A, 312N) includes a private side port identifier (316). A private side port identifier may be a string of characters (e.g., letters, numbers, symbols, etc.) that are used to identify a physical port of a network element and/or a port designated for use by a particular communication protocol. In one embodiment of the invention, the ports identified by a private side port identifier may be representative of the ports that are connected to elements (e.g., computing systems, virtual machines, etc.) of a private network. In such an embodiment, the network element on which those ports reside may serve as a default gateway or access point through which resources may be exchanged between the private network and a public network such as the Internet. By way of an example, a private side port identifier may be an alphanumeric designation such as "Ethernet3", "80", etc.

In one embodiment of the invention, each of the one or more DNAT table entries (312A, 312N) includes a public IP address (318). The public IP address may correspond to one of a pool of available public IP addresses reserved for facilitating Internet connectivity between elements of a private network and public network systems (discussed above). In one embodiment of the invention, a public IP address may be dynamically assigned (or mapped), by the network element, as requests for public network resources, from one or more of the private network systems (see e.g., FIG. 1), arise. That is, the public IP address in a DNAT table entry temporarily assigns an Internet routable address to which public network system resources, in response to requests by private network systems, may be directed.

In one embodiment of the invention, each of the one or more DNAT table entries (312A, 312N) includes a public side port identifier (320). A public side port identifier may be substantially similar to a private side port identifier (316) with the exception of being used to identify ports (of the network element and/or through use of a particular communication protocol) that may be connected to public network systems (e.g., the Internet) and/or other peer network elements.

Additional and/or alternative information may be included in a DNAT table entry (312A, 312N) without departing from the invention. For example, each of the one or more DNAT table entries may further specify the communication protocol (e.g., transmission control protocol (TCP), user datagram protocol (UDP), etc.) to which the IP addresses and ports are associated.

FIGS. 4-7 show flowcharts in accordance with one or more embodiments of the invention. While the various steps in the flowcharts are presented and described sequentially, one of ordinary skill will appreciate that some or all of the steps may be executed in different orders, may be combined or omitted, and some or all steps may be executed in parallel. In one embodiment of the invention, the steps shown in FIGS. 4-7 may be performed in parallel with any other steps shown in FIGS. 4-7 without departing from the invention.

Figure 4:
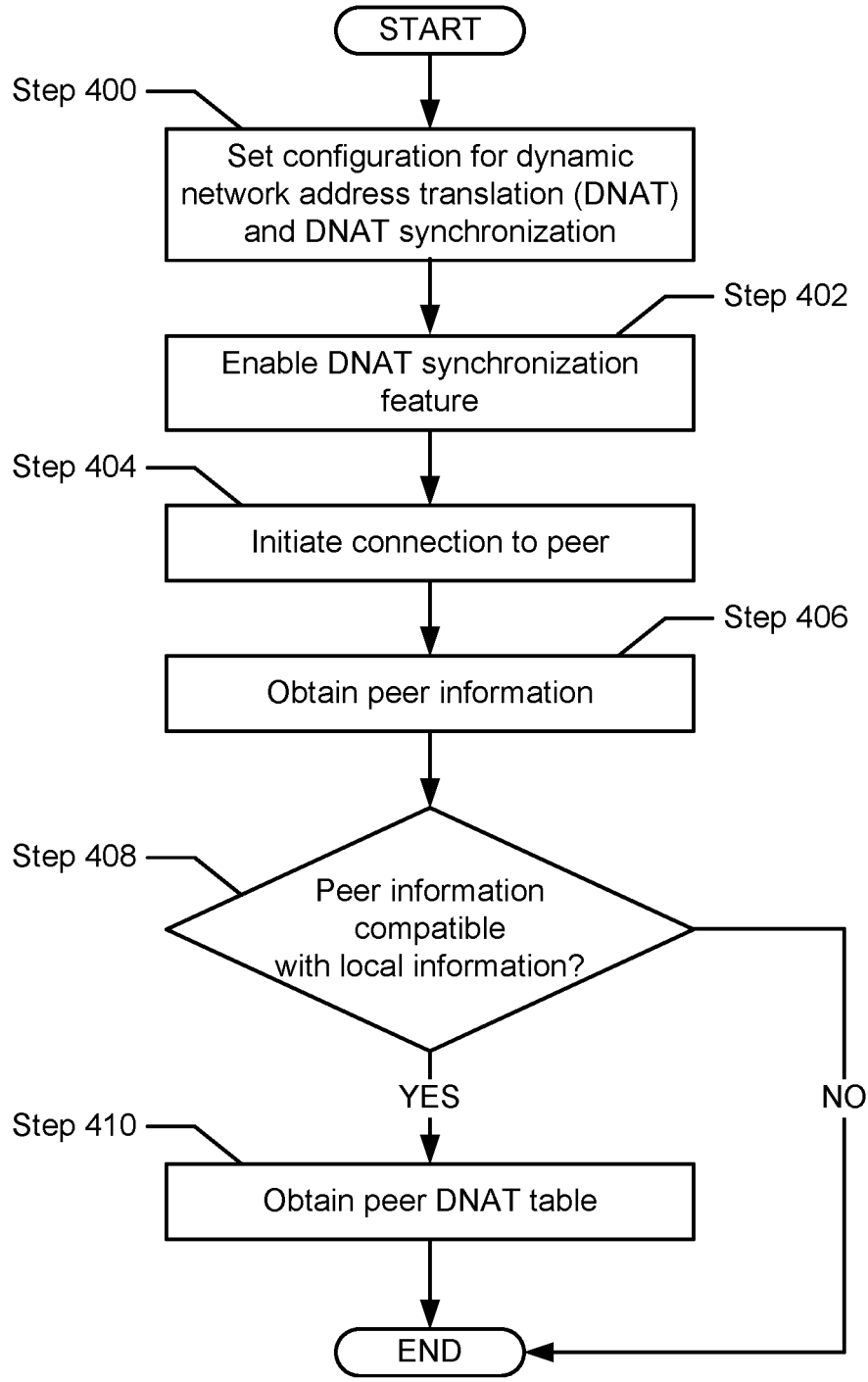
FIG. 4 shows a flowchart that describes a method for mounting a peer DNAT table in accordance with one or more embodiments of the invention.

FIG. 4 shows a flowchart that describes a method for mounting a peer DNAT table in accordance with one or more embodiments of the invention. In Step 400, configurations for dynamic network address translation (DNAT) and DNAT synchronization are set. Further, for the two or more network elements onto which DNAT state is to be shared, these configurations are encouraged to be compatible across those network elements. In one embodiment of the invention, parameters pertinent to the configuration of DNAT, for each of the two or more network elements, may be established first. By way of examples, parameters that are set with respect to the configuration of DNAT may include, but are not limited to, the DNAT pool and an access control list. In one embodiment of the invention, as discussed above, the DNAT pool may refer to the group of available public IP addresses (that are Internet routable) that may be allotted to the private network from an ISP. Specifically, other than the list of available public IP addresses, other information such as netmask and/or prefix length information may also be included in the DNAT pool. In one embodiment of the invention, the access control list may be representative of a configuration script that dictate how a network element is to handle incoming packets (e.g., media access control (MAC) frames, Internet protocol (IP) packets, etc.) from inside and/or outside the private network. After parameters for the configuration of DNAT are established, in one embodiment of the invention, parameters pertinent to the configuration of DNAT synchronization are set. Parameters that attribute towards the configuration of DNAT synchronization include, but are not limited to, a list of peer network element addresses, the local interface, and a designated port range. In one embodiment of the invention, the list of peer network element address specifies the one or more IP addresses associated with the one or more peer network elements to which DNAT synchronization applies. Moreover, in handling the acceptance of connections from a peer network element, the local interface is configured. In one embodiment of the invention, the designation of a port range may refer to a mapping of which ports on each of the network elements lead to the private network, and which ports lead towards the Internet. A port range may be specified in order to avoid conflicts in the translation of destination addresses between the two or more network elements. Another configuration consideration to note includes, but is not limited to, verifying that the two or more network elements are IP reachable (i.e., that no dedicated physical connection between the network elements is necessary).

In Step 402, after a configuration is determined and set, the DNAT synchronization feature on the network element(s) is enabled. In one embodiment of the invention, the configuration and enablement of the aforementioned feature may be programmed into the network element by a network or datacenter administrator before or after deployment of the network element in a network or datacenter.

In Step 404, in response to the enablement of the DNAT synchronization feature on a network element, the network element proceeds to establish a connection with each of its one or more peer network elements. From here, the following discussion details the interactions between a network element and one of the one or more peer network elements onto which DNAT state is to be synchronized in accordance with one or more embodiments of the invention. As such, one of ordinary skill will recognize that the following discussion serves not to limit the scope of the invention, but rather to not overly complicate aspects of the invention in this disclosure. Further, though the discussion to follow will predominantly be from the perspective of the network element, one of ordinary skill would appreciate that the peer network element may be performing the same steps in parallel with those that are performed by the network element for at least a portion of flowcharts disclosed.

Returning to Step 404, the network element proceeds to establish a connection with the peer network element. In one embodiment of the invention, this connection may utilize any combination of wired and/or wireless communication protocols. For example, both the network element and the peer network element may initiate a simultaneous open connection, whereupon both network elements instantiate an active-open transmission control protocol/Internet Protocol (TCP/IP) socket permitting both the network elements to connect to one another simultaneously. By way of another example, one of the network elements (e.g., a first network element) may pursue actively-opening a TCP/IP socket towards the other (e.g., a second network element), while the second network element yields, thereby establishing a passive-open socket that which waits for contact from the first network element.

In Step 406, after a connection is established with the peer network element, peer information is obtained from the peer network element. In one embodiment of the invention, the peer information may be provided, by the peer network element, in response to a request submitted by the network element. In another embodiment of the invention, the network element may be given permission to mount (e.g., access/copy) certain portions of the file system incorporated in the peer network element. In such an embodiment, the network element may mount a particular portion of the peer network element file system where the peer information is known to reside, and following said mounting, the network element may obtain the peer information. Peer information, for example, may include information indicating the current version of the operating system (OS) and/or firmware that may be executing on a network element. Additionally, peer information may also include DNAT configuration information that is set on the peer network element (see e.g., Step 400).

In Step 408, a determination is made as to whether the peer information (obtained from the peer network element in Step 406) is compatible with local information (associated with the network element). In one embodiment of the invention, compatibility may require that the current version of the OS and/or firmware on the network element match the current version of the OS and/or firmware on the peer network element. Further to such an embodiment, compatibility may require that local DNAT configuration information (associated with the network element) matches peer DNAT configuration information (associated with the peer network element). In another embodiment of the invention, compatibility may permit extensions into backward and/or forward compatibility amongst the software, firmware, and/or hardware executing and/or contained within the network elements. Subsequently, if it is determined that the local information and the peer information is compatible, the process proceeds to Step 410; otherwise, if the local information and the peer information are deemed incompatible, the process ends.

In Step 410, upon determining that the local and peer version information are compatible, the peer dynamic network address translation (DNAT) table, associated with the peer network element, is obtained. As discussed above, in one embodiment of the invention, the obtaining of the peer DNAT table, by the network element, may be achieved through a request-response mechanism. In another embodiment of the invention, the network element may be given access to the portion of the file system where the DNAT table resides in the peer network element, thereby enabling the network element to mount the peer DNAT table. In one embodiment of the invention, mounting of the peer DNAT table may include storing and maintaining a copy of the peer DNAT table in the system state database (SSD) of the network element.

Figure 5:
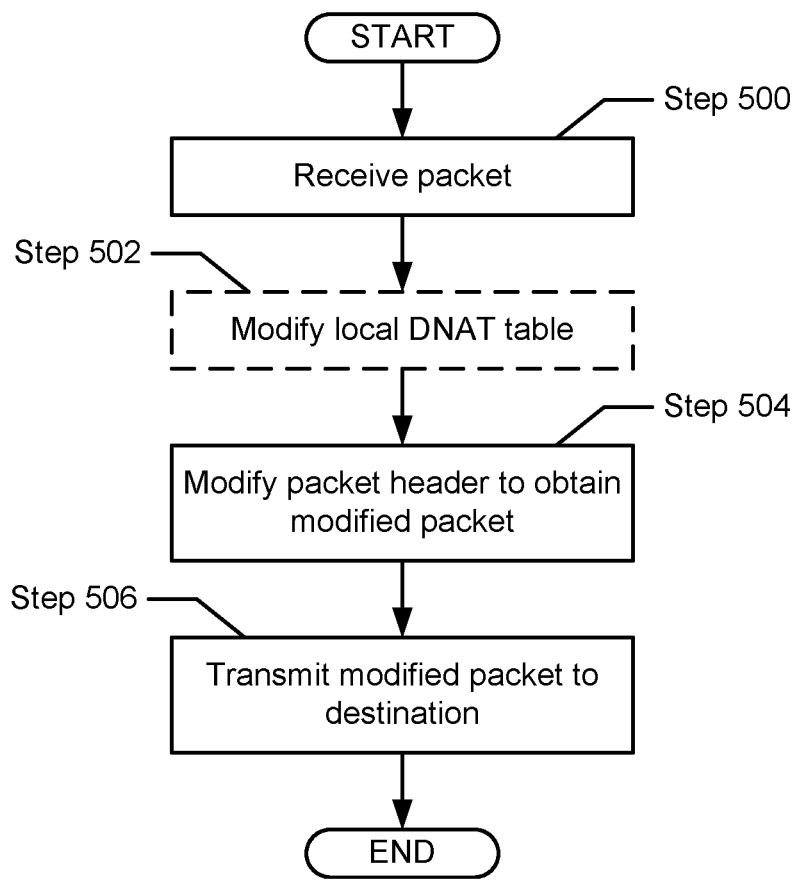
FIG. 5 shows a flowchart that describes a method for the normal DNAT processing of packets in accordance with one or more embodiments of the invention.

FIG. 5 shows a flowchart that describes a method for the normal DNAT processing of packets in accordance with one or more embodiments of the invention. In Step 500, a packet is received by the network element. In one embodiment of the invention, the packet may have arrived at a private-side port of the network element, which is representative of a port through which traffic to/from private network systems, of the private network (see e.g., FIG. 1), traverses. Conversely, in another embodiment of the invention, the packet may have arrived at a public-side port of the network element, through which traffic to/from public network systems traverses.

In Step 502, based on the port side (or range of ports) through which the received packet arrived, the local DNAT table, associated with the network element, may or may not be modified. One of ordinary skill will recognize that information exchanged between private and/or public network systems may encompass one or more packets. That is, for example, in forwarding a request for resources from a private network system to a public network system, the request may include data that spans one or more payloads (e.g., one or more packets). Similarly, in forwarding a response to a request for resources, from a public network system to a private network system, the response may include data that spans one or more packets. In one embodiment of the invention, the aforementioned exchange of information, which includes at least a first set of packets defining a request, and a second set of packets defining a response, may be described as a session (e.g., TCP/IP session). In view of this, the local DNAT table may be modified when the received packet is: (i) a first packet in the one or more packets defining a request for resources outside a private network; or (ii) a last packet in the one or more packets defining a response that includes resources from a public network system. One of ordinary skill will appreciate that existing communication protocols include built-in mechanisms for which a first and/or a last packet within a session (and/or a sequence) is identified.

Proceeding with the discussion of Step 502, in one embodiment of the invention, modification of the local DNAT table may refer to the creation of a local DNAT table entry (see e.g., FIG. 3B). In such an embodiment, the packet (received in Step 500) may have arrived at a private-side port. Further, the creation of a local DNAT table entry is performed upon identifying the packet as a first packet defining a request within a session. Accordingly, the newly created entry includes at least: (i) the private IP address of the resource-requesting private network system; (ii) the identifier for the private-side port through which the packet was received; (iii) one of the public IP addresses (whichever is available) allotted to the private network for Internet connectivity; and (iv) the identifier for the public-side port through which the packet is to be forwarded towards its destination. In one embodiment of the invention, the aforementioned private IP address may be ascertained from examination of header information (e.g., the source IP address) pertaining to the packet. Further, it logically stands that once a public IP address is assigned towards a packet, that IP address may be marked unavailable amongst the pool (or list) of available public IP addresses allotted to the private network. As discussed above, in one embodiment of the invention, this list may be maintained in the SSD of the network element. In one embodiment of the invention, when a packet (received in Step 500) is not identified as a first packet defining a request within a session, modification of the local DNAT table may not occur, thereby forwarding the process to Step 504.

In another embodiment of the invention, modification of the local DNAT table may refer to the deletion of a local DNAT table entry. In such an embodiment, the packet (received in Step 500) may have arrived at a public-side port. Further, the deletion of a local DNAT table entry is performed when the packet is identified as the last packet defining a response within a session. Accordingly, upon receiving the packet, header information (e.g., the destination IP address) pertaining to the packet may be examined. In the event an entry exists in the local DNAT table that includes a public IP address matching the destination IP address of the packet, the packet may be granted entry into the private network, and accordingly, the identified local DNAT table entry is subsequently deleted. The public IP address used in that identified entry may then be marked available again within the allotted pool of public IP addresses maintained on the network element. In one embodiment of the invention, the network element may refuse entry, into the private network, of a packet that does not include a destination IP address matching one of the allotted public IP addresses. In one embodiment of the invention, a local DNAT entry may also be deleted from the local DNAT table after an acknowledgement and/or a response has not been received from a public network system after a predetermined duration of time (e.g., after the session timeout has expired). In one embodiment of the invention, when the packet (received in Step 500) is not identified as the last packet defining the response within a session, modification of the local DNAT table may not occur, thus forwarding the process to Step 504.

In Step 504, after the creation or deletion of a local DNAT table entry, at least a portion of the header information pertaining to the received packet is modified. That is, in the embodiment presented above in which the received packet arrives at a private-side port of the network element, the network element may at least modify (or replace) the source IP address information included in the header of the received packet. In this embodiment, the original source IP address corresponds to the private IP address associated with the private network system, which had generated and transmitted the packet. Moreover, this original source IP address would be replaced with the public IP address (e.g., one of the available public IP addresses allotted to the private network by the ISP) designated within the local DNAT table entry (see e.g., 318 in FIG. 3B) created in Step 502. In one embodiment of the invention, because the private IP address of the private network system is not Internet routable, the source IP address included in the packet needs to be replaced with a public IP address, which is Internet routable. In performing this substitution, any response(s) from the destination (e.g., a public network system) back to the private network system may be directed to the private network (or the network element) using the assigned public IP address.

Further to Step 504, in the alternative embodiment presented above in which the received packet arrives at a public-side port of the network element, the network element may at least modify (or replace) the destination IP address information included in the header of the received packet. In this embodiment, the original destination IP address would correspond to the public IP address that replaced the private IP address of the private network system to which the packet is destined. Accordingly, this original destination IP address is replaced with the private IP address designated within the local DNAT table entry (see e.g., 314 in FIG. 3B) that may have been deleted in Step 502. In one embodiment of the invention, the private IP address would have been obtained prior to deletion of the aforementioned local DNAT table entry.

In Step 506, the modified packet, obtained from modifying at least a portion of the header information pertaining to the received packet, is transmitted towards a destination. In one embodiment of the invention, the destination may be a public network system (e.g., a server) that is accessible via the public Internet. In another embodiment of the invention, the destination may be a private network system, within the private network, which may be receiving resources in response to a request submitted earlier.

Figure 6A:
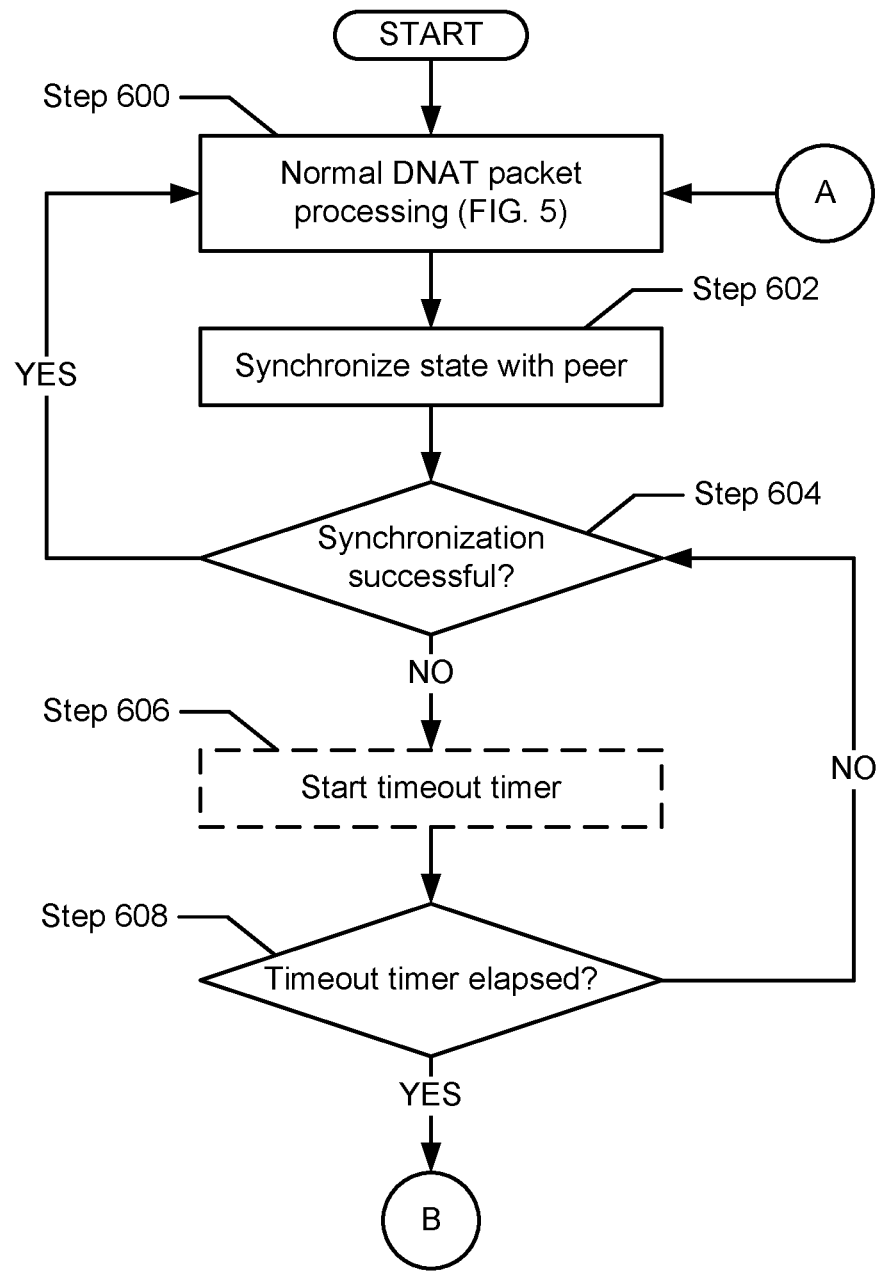
FIG. 6A shows a flowchart that describes a method for detecting the failure of a peer network element in accordance with one or more embodiments of the invention.

FIG. 6A shows a flowchart that describes a method for detecting the failure of a peer network element in accordance with one or more embodiments of the invention. In Step 600, the network element may be processing incoming packets in accordance with normal DNAT operations as described in FIG. 5. In Step 602, the network element attempts to synchronize DNAT state with the peer network element. In one embodiment of the invention, this synchronization of DNAT state may occur periodically (at a predetermined interval of time). Alternatively, in another embodiment of the invention, the synchronization of DNAT state may be triggered by the occurrence of a predetermined number (e.g., one or more) of modifications (e.g., entry creations or deletions) that incur onto the local DNAT table. Further, in one embodiment of the invention, the synchronizing of DNAT state may encompass the pushing (or transmitting) of local DNAT table entries and/or DNAT configuration information (e.g., DNAT policies/rules, DNAT public IP address pools, etc.) towards the peer network element. In one embodiment of the invention, occurring simultaneously, the peer network element may be attempting to push (or transmit) its local DNAT table entries and/or DNAT configuration information towards the network element (so that the peer DNAT table, that is associated with the peer network element, and is stored in the SSD of the network element, may be updated).

In Step 604, a first determination is made as to whether synchronization of the DNAT state was successful. In one embodiment of the invention, identifying whether the transmitted DNAT state was received by the peer network element may be achieved through data acknowledgement mechanisms built into the communication protocol being used. By way of an example, within the TCP/IP communication protocol, acknowledgements (e.g., Acks) are commonplace and sent by the receiver of data towards the transmitter of the data, thereby informing the transmitter that the data had been received by the receiver. Subsequently, if it is determined that the synchronization of DNAT state was successful, the process would revert back to Step 600, whereupon the processing of packets, by the network element, would continue normally until another synchronization event occurs. Conversely, if it is determined that the synchronization of DNAT state was unsuccessful (e.g., an acknowledgement had not been received back from the peer network element), then the process proceeds to Step 606 or 608 depending on the circumstance.

In Step 606, a timeout timer is started. In the event that the timeout timer had already been initiated (after the first failed attempt to synchronize the DNAT state with the peer network element), the process proceeds to Step 608. In one embodiment of the invention, the timeout timer may be set as a countdown from a predetermined value of time.

In Step 608, a second determination is made as to whether the predetermined duration of time, set forth by the timeout timer, has elapsed. If the timeout timer has yet to elapse, retransmission of the DNAT state (to the peer network element) may be attempted, thereby leading the process back to Step 604. On the other hand, if it is determined that the timeout timer has expired, then this event would serve as an indicator, to the network element, that the peer network element has failed. One of ordinary skill would appreciate that other network infrastructure elements (e.g., a private network system, a public network system, etc.) may determine or detect failure of the peer network element through their own means. Moreover, upon detecting that the peer network element has failed, one of ordinary skill would further appreciate that the other network infrastructure elements may, in response, divert outgoing traffic that had once traversed through the (now failed) peer network element to another network element that is still operational. From here, the process continues through to FIG. 6B.

Figure 6B:
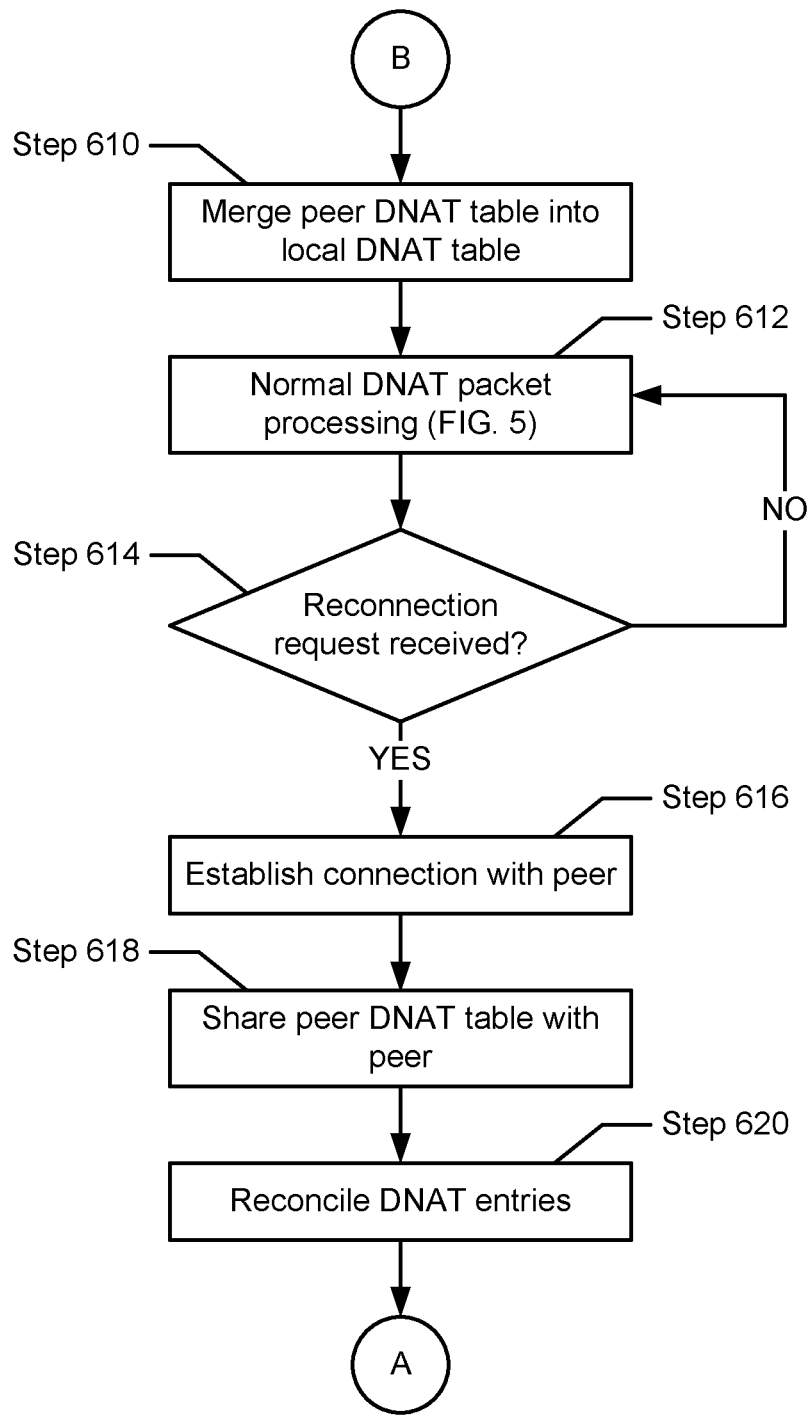
FIG. 6B shows a flowchart that describes a method for operating a network element after which a peer network element has failed in accordance with one or more embodiments of the invention.

FIG. 6B shows a flowchart that describes a method for operating a network element after a peer network element has failed in accordance with one or more embodiments of the invention. In Step 610, in response to a network element detecting that a peer network element has failed (see e.g., FIG. 6A), entries pertaining to the copy of the peer DNAT table (stored in the SSD of the network element) are merged into the local DNAT table. In one embodiment of the invention, merging of the peer DNAT table entries into the local DNAT table may include, but is not limited to, the appending (or copying) of all entries in the stored peer DNAT table to the local DNAT table. In one embodiment of the invention, the resulting local DNAT table (i.e., after the merging) may include and/or maintain the dynamic network address translations for packets that have and/or will traverse the network element, as well as the packets that have traversed through the peer network element. As discussed above, outgoing traffic originating from a private or public network system that had once traversed the peer network element may be routed towards the functional network element in response to their detection of the peer network element's failure.

In Step 612, in applying modifications to the resulting local DNAT table, the (functional) network element continues to process packets normally. As mentioned above, the incoming packets now consist of (i) packets that continue to be directed towards a destination via the network element; and (ii) packets that, prior to failure of the peer network element, were being directed towards the peer network element, but are now being redirected towards the functioning network element in order to reach their destinations. Additionally, in one embodiment of the invention, the functioning network element may, at this point, instantiate a passive-open communication socket, which would be kept open to permit the peer network element to re-establish a connection with the network element (discussed below; see e.g., FIG. 7).

In Step 614, a determination is made, by the network element, as to whether the peer network element has attempted to reconnect. In one embodiment of the invention, after the peer network element has re-initialized, the peer network element may attempt reconnection by opening an active communication socket directed at the network element. In such an embodiment, the passive-open communication socket, established earlier (see e.g., Step 612) by the network element, may inform the network element that the peer network element is attempting to reconnect. If it is determined that a reconnection request has yet to be received from the peer network element, the process reverts back to Step 612. Alternatively, if it is determined that the peer network element is reaching out towards reconnecting with the network element, the process proceeds to Step 616.

In Step 616, upon determining that a re-initialized peer network element is attempting to reconnect with the network element, a connection with the peer network element is established. In one embodiment of the invention, re-establishment of a connection between the network element and the peer network element may involve processes specific to the communication protocol employed. For example, in using the TCP/IP protocol, one of ordinary skill would recognize the well-known TCP 3-way handshake process as the interaction that precedes the establishment of a connection between systems (e.g., the network element and the peer network element).

In Step 618, after a connection with the peer network element has been re-established, the maintained copy of the peer DNAT table (stored in the SSD of the network element) is shared with the peer network element. In one embodiment of the invention, the maintained copy of the peer DNAT table may reflect the state of the peer DNAT table prior to failure of the peer network element. In another embodiment of the invention, the maintained copy of the peer DNAT table may include updates (e.g., entry creations and/or deletions) tracked by the network element post-failure of the peer network element. In such an embodiment, the network element may update the peer DNAT table copy: (i) in real-time, as packets, that originally traversed through the peer network element, arrive and are processed at the (functioning) network element; or (ii) as a batch process, which includes the creating and/or deleting of entries to the peer DNAT table copy just prior to the sharing of the peer DNAT table copy with the peer network element. Furthermore, in one embodiment of the invention, sharing of the peer DNAT table may involve pushing (or transmitting) the peer DNAT table immediately upon reconnection without necessity for a request from the peer network element. In another embodiment of the invention, sharing of the peer DNAT table may involve the transmitting of the peer DNAT table in response to receiving, by the network element, a request from the peer network element.

In Step 620, after the copy of the peer DNAT table, stored in the SSD of the network element, is shared with the peer network element, the entries within the local and peer DNAT tables are reconciled. In one embodiment of the invention, reconciliation of the local and peer DNAT tables may include deleting any entries in the local DNAT table (associated with the network element) that remains as one of the entries in the peer DNAT table (associated with the peer network element). After reconciliation is complete, the process proceeds to Step 600 in FIG. 6A.

Figure 7:
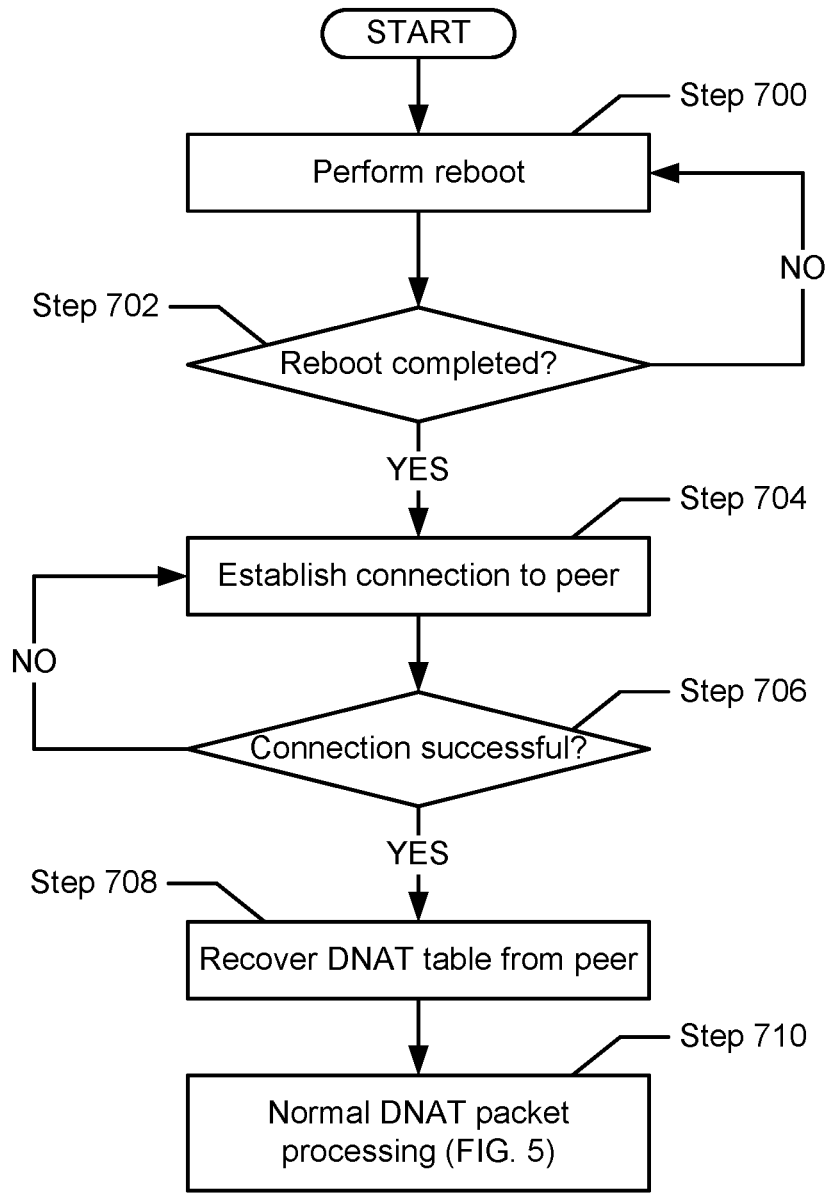
FIG. 7 shows a flowchart that describes a method for post-failure recovery in accordance with one or more embodiments of the invention.

FIG. 7 shows a flowchart that describes a method for post-failure recovery in accordance with one or more embodiments of the invention. In Step 700, immediately after experiencing failure, a network element performs a reboot. In Step 702, a first determination is made as to whether the reboot process is complete. If it is determined that the network element has completed rebooting, the process proceeds to Step 704; otherwise, the network element is still rebooting, and thus, the process reverts back to Step 700.

In Step 704, upon completion of the reboot process, the network element (or more specifically, e.g., the NAT agent (see e.g., FIG. 2)) attempts to re-establish a connection with a peer network element, which through the peer state synchronization mechanism, maintains a copy of the network element's local DNAT table (stored on the peer network element as a peer DNAT table) pre-failure of the network element. In one embodiment of the invention, in an attempt to reconnect with the peer network element, the re-initialized network element may open an active communication socket directed at the peer network element.

In Step 706, a second determination is made as to whether the establishment of a connection between the network element and the peer network element was successful. In one embodiment of the invention, re-establishment of a connection between the network element and the peer network element may involve processes specific to the communication protocol employed. For example, in using the TCP/IP protocol, one of ordinary skill would recognize the well-known TCP 3-way handshake process as the interaction that precedes the establishment of a connection between systems (e.g., the network element and the peer network element). If it is determined that a connection was indeed established, the process continues onto Step 708. Otherwise, if it is determined that the attempt at reconnection was unsuccessful, the network element may continue retransmitting requests to connect (and/or opening active communication sockets), as in Step 704, until a connection is finally established.

In Step 708, the local DNAT table, for the re-initialized network element, is recovered from the peer network element. In one embodiment of the invention, the peer network element may provide its copy of the DNAT table associated with the re-initialized network element to the re-initialized network element in response to receiving a request for the DNAT table by the re-initialized network element. In another embodiment of the invention, upon establishment of a connection, the re-initialized network element may receive a pre-failure copy of its local DNAT table from the peer network element without the transmission of a request first.

In Step 710, upon completing the recovery process (of Step 708), the re-initialized network element proceeds towards normally processing packets based on its DNAT synchronization configuration.

FIGS. 8A-8D show an example in accordance with one or more embodiments of the invention. The following example is for explanatory purposes only and not intended to limit the scope of the invention.

Figure 8A:
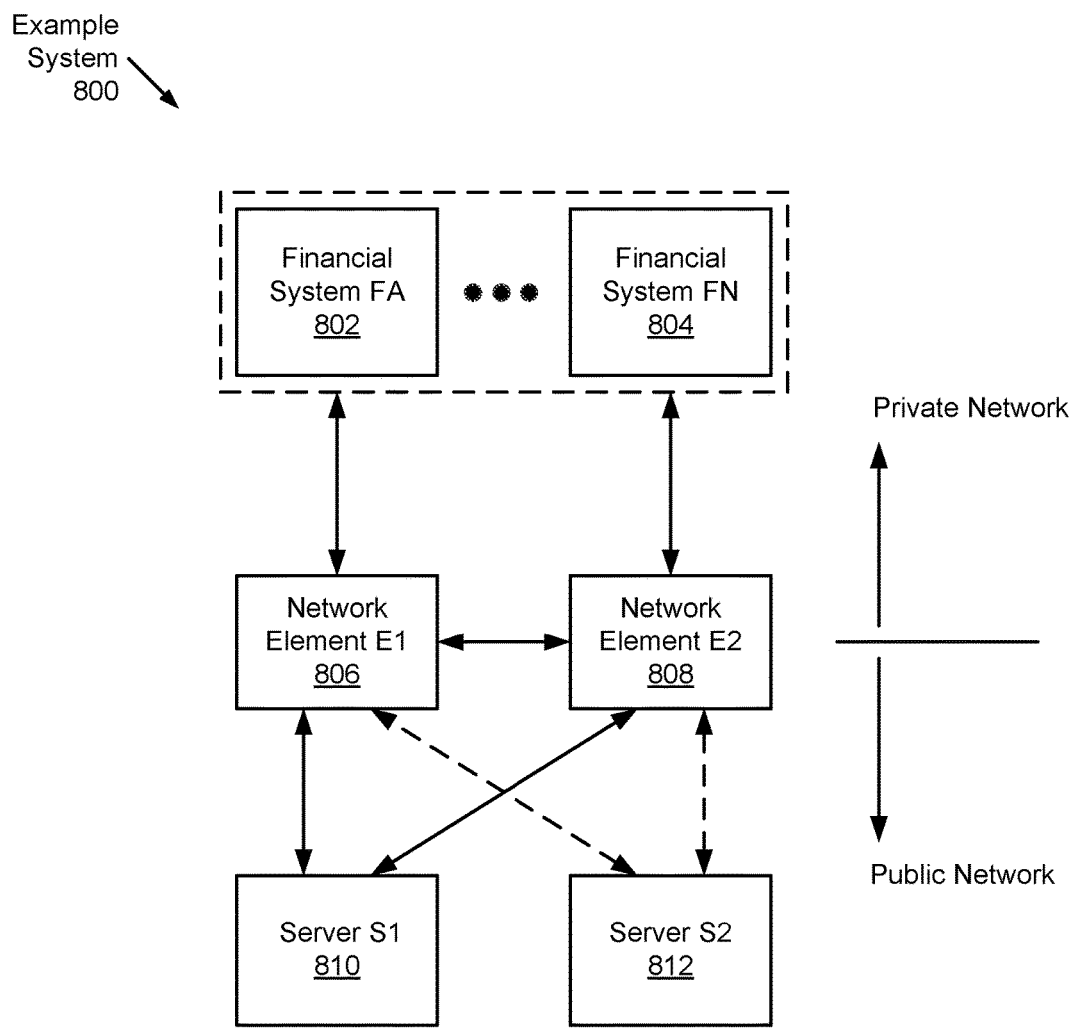
FIGS. 8A-8D show an example in accordance with one or more embodiments of the invention.

FIG. 8A shows an example system in accordance with one or more embodiments of the invention. The example system (800) includes one or more financial systems FA-FN (802, 804), which, while interconnected with one another, make up a private network. The example system also includes two network elements E1 and E2 (806, 808) that are operatively connected to the computing systems of the private network (e.g., FA-FN). In one embodiment of the invention, network elements E1 and E2 may represent gateways between the private network and the public network (or Internet). Additionally, the example system (800) includes two servers S1 and S1 (810, 812), from which financial systems FA-FN frequently request resources. Servers S1 and S2 are representative of public network systems, and are operatively connected to the network elements E1 and E2.

Figure 8B:
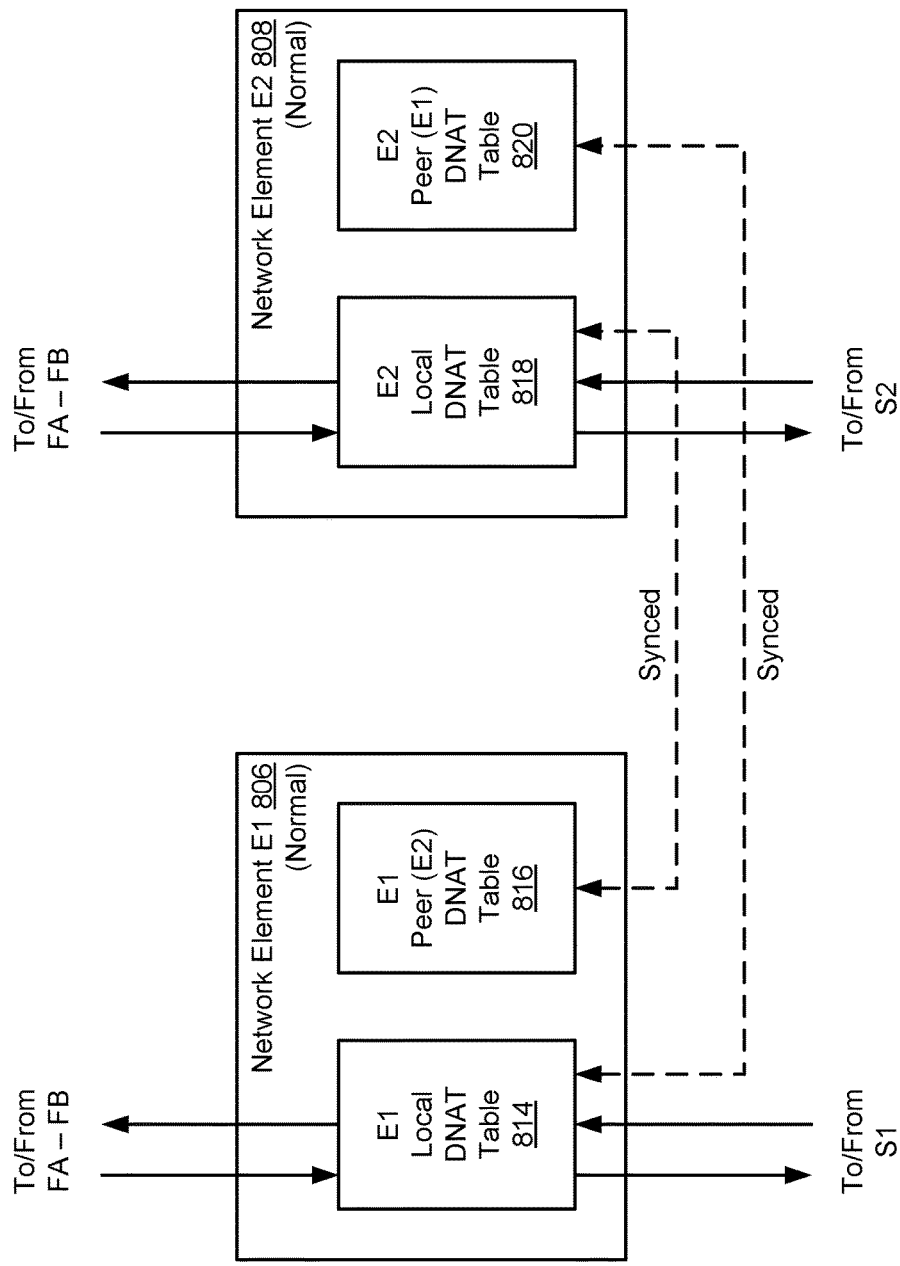

FIG. 8B shows the network elements under normal operation in accordance with one or more embodiments of the invention. Per normal operation, in one embodiment of the invention, network element E1 (806) retains a local DNAT table (814) to which modifications (e.g., entry creations and deletions) are performed while packets between FA-FB and S1 traverse. Similarly, network element E2 (808) retains a local DNAT table (818) to which modifications are performed while packets between FA-FB and S2 traverse. In addition, each network element maintains a copy of the other's local DNAT table, as a peer DNAT table, which periodically gets synchronized. Accordingly, a copy of the local DNAT table associated with E2 (818) may be mounted/stored in E1 as a peer DNAT table (816); and similarly, a copy of the local DNAT table associated with E1 (814) may be mounted/stored in E2 as a peer DNAT table (820).

Figure 8C:
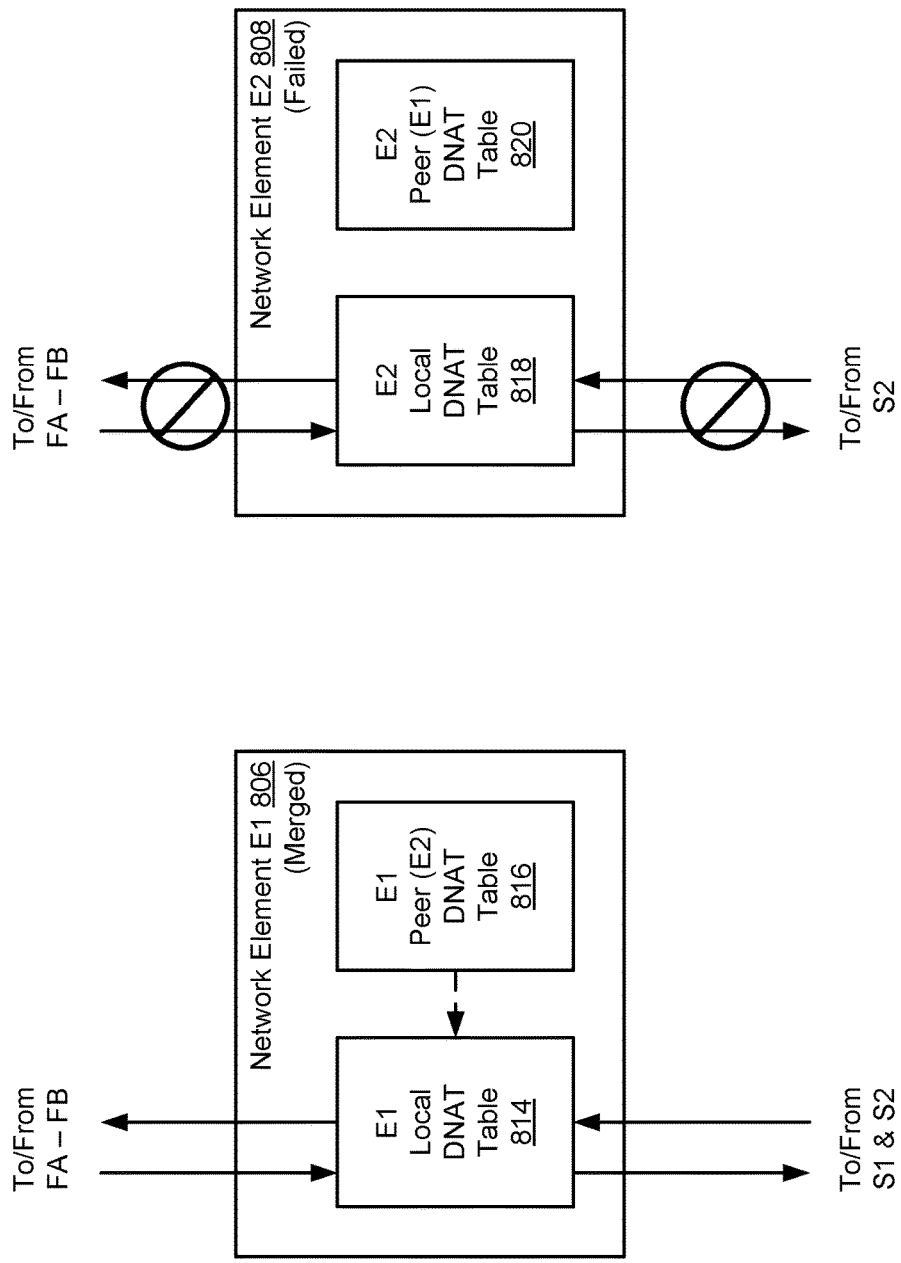

FIG. 8C shows the network elements after a failure in accordance with one or more embodiments of the invention. At this point, network element E2 (808) has failed. In response, in one embodiment of the invention, traffic that had once traversed through E2 is redirected through network element E1 (806). Meanwhile, E1, having detected that E2 has failed (in accordance with the method described in FIG. 6A), merges entries within its copy of E2's local DNAT table (or the stored peer DNAT table) (816) into its own local DNAT table (814). In one embodiment of the invention, the resulting local (or merged) DNAT table on E1 (814) continues to create and delete entries based on the traversing of packets to/from the private network (e.g., financial systems FA-FB (802, 804)) and to/from not only Server S1 (810), but Server S2 (812), as well (i.e., public network systems). In one embodiment of the invention, entries, which are created and/or deleted corresponding to traffic from Server S2, are tracked and are either representative of updates to the stored peer DNAT table (816) in real-time (as traffic is processed) or on-demand (upon re-connecting with network element E2).

Figure 8D:
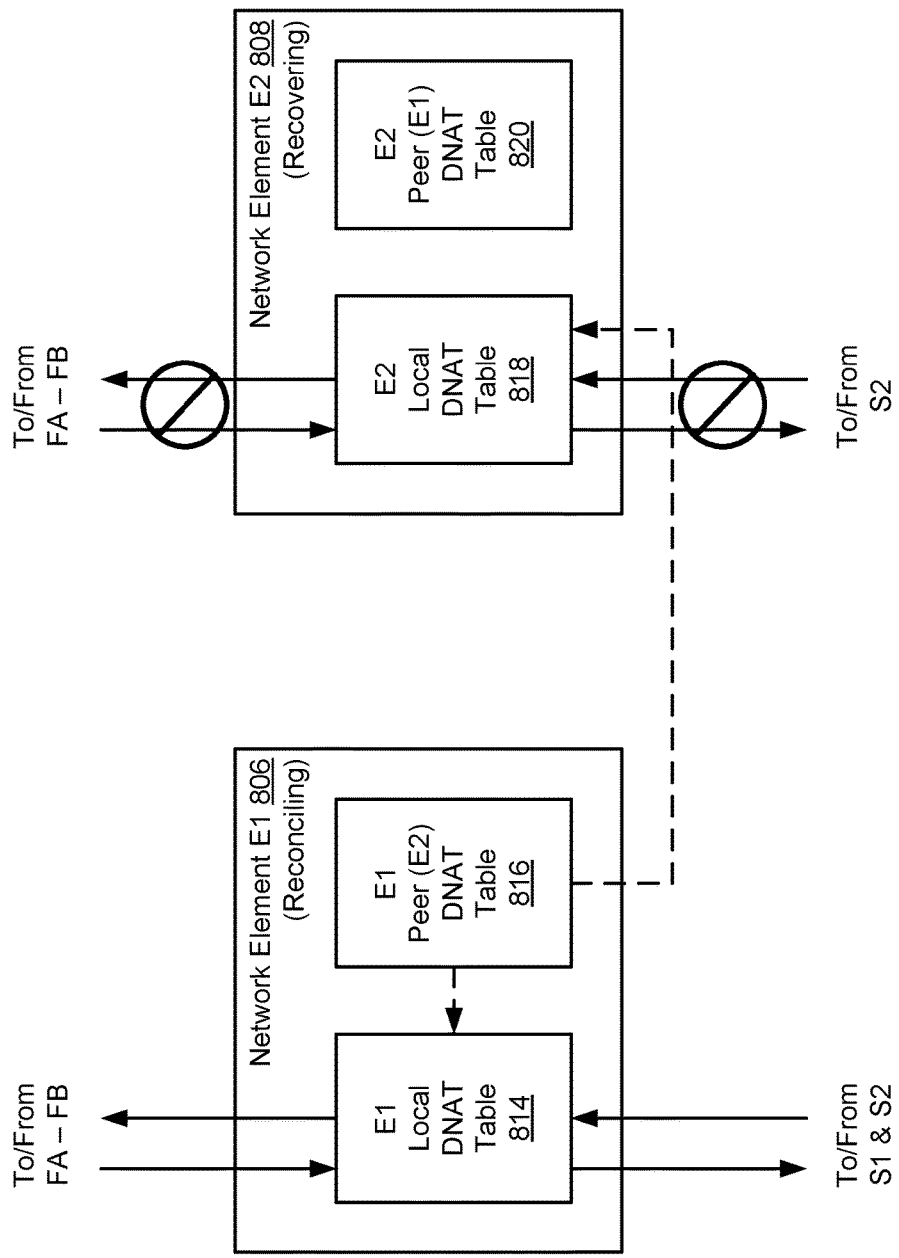

FIG. 8D shows the network elements after the rebooting of the failed network element in accordance with one or more embodiments of the invention. As discussed above, immediately after re-initialization, network element E2 (808) attempts to re-establish a connection with its peer network element (e.g., network element E1 (806)) in order to obtain the state of its local DNAT table prior to the incident of failure. In one embodiment of the invention, after rebooting, all data structures in the SSD, including the local DNAT table (818) and the peer DNAT table (820), may be cleared or reset to a default value. As such, towards regaining normal functionality, network element E2 requests or otherwise obtains the copy of its local DNAT table (stored on E1) (816) after a connection with E1 has been established. With regards to network element E1, after providing its stored peer DNAT table (816) to E2, E1 proceeds in reconciling entries in its local DNAT table (814) with the peer DNAT table (816). As discussed above, in one embodiment of the invention, reconciliation may involve the deletion of any entries in the local DNAT table (814) that match each entry in the peer DNAT table (816). Lastly, both network elements return to normal functionality as portrayed in FIG. 8B.

Figure 9:
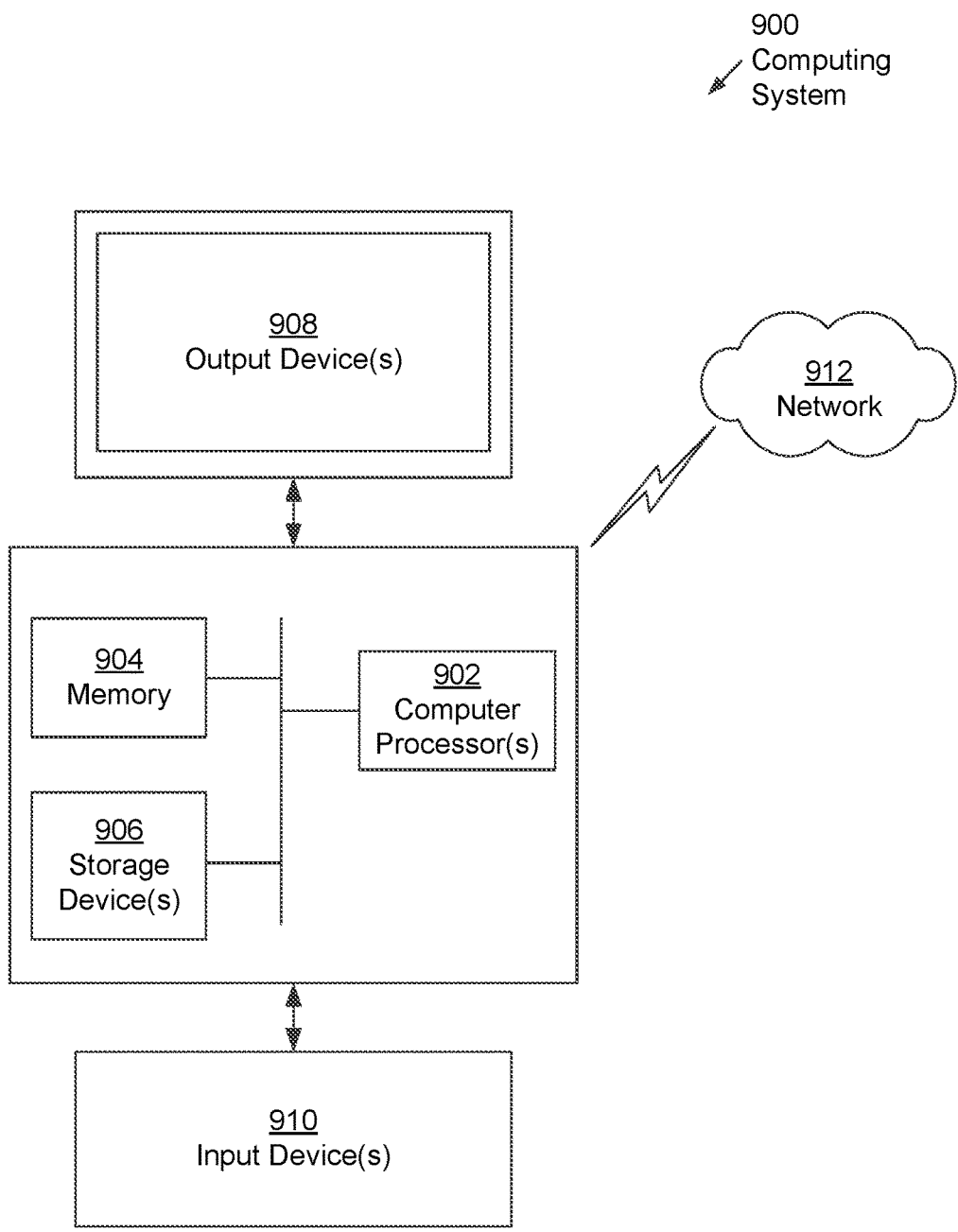
FIG. 9 shows a computing system in accordance with one or more embodiments of the invention.

Embodiments of the invention may be implemented on a computing system. Any combination of mobile, desktop, server, embedded, or other types of hardware may be used. For example, as shown in FIG. 9, the computing system (900) may include one or more computer processors (902), associated memory (904) (e.g., random access memory (RAM), cache memory, flash memory, etc.), one or more storage devices (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input devices (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (914) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and connected to the other elements over a network (914). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets, comprising:
   maintaining, by a network element comprising a processor, a peer dynamic network address translation (DNAT) table associated with a peer network element;
   detecting, using the processor, that the peer network element has failed;
   merging, in response to the detecting and using the processor, the peer DNAT table into a local DNAT table to obtain a merged DNAT table; and
   processing, using the processor, an incoming packet using the merged DNAT table.

2. The method of claim 1, wherein the network element and the peer network element are each one selected from a group consisting of a switch, a router, and a multilayer switch.

3. The method of claim 1, wherein maintaining the peer DNAT table comprises:
   obtaining, from the peer network element, at least one entry of a second local DNAT table;
   storing the at least one entry of the second local DNAT table locally in the peer DNAT table; and
   obtaining, from the peer network element, updates to the second local DNAT table.

4. The method of claim 3, wherein the at least one entry of the second local DNAT table is obtained via a push-mechanism.

5. The method of claim 3, wherein the updates are obtained periodically.

6. The method of claim 1, wherein detecting that the peer network element has failed, comprises:
   attempting to synchronize DNAT state with the peer network element;
   making a first determination that the attempting was unsuccessful;
   initiating, in response to the first determination, a timeout timer; and
   making a second determination that the peer network element has failed when the timeout timer has elapsed.

7. The method of claim 6, wherein the synchronization of DNAT state is unsuccessful when an acknowledgement packet is not received from the peer network element.

8. The method of claim 1, wherein the incoming packet is rerouted to the network element upon failure of the peer network element.

9. The method of claim 1, further comprising:
   re-establishing a connection with the peer network element after the peer network element has rebooted; and
   providing, after the connection is established, the peer DNAT table to the peer network element.

10. The method of claim 9, further comprising:
    prior to providing the peer DNAT table to the peer network element:
      updating the peer DNAT table using at least one entry of the merged DNAT table.

11. The method of claim 9, further comprising:
    reconciling the merged DNAT table to obtain a new local DNAT table.

12. The method of claim 11, wherein reconciling the local DNAT table comprises, for each entry of the peer DNAT table, deleting an entry of the local DNAT table matching the entry of the peer DNAT table.

13. The method of claim 1, further comprising:
    the peer network element after re-initializing in response to a failure:
      re-establishing a connection with the network element; and
      recovering, after the connection is established, the peer DNAT table from the network element.

14. A network element, comprising:
    a processor;
    a memory;

a persistent storage device;
a physical port; and
a control plane executing using the processor and comprising a system state database (SSD) and a network address translation (NAT) agent, wherein the SSD and the NAT agent are operatively connected,
wherein the NAT agent is programmed to:
  maintain, on the SSD, a peer dynamic network address translation (DNAT) table associated with a peer network element;
  detect that the peer network element has failed;
  merge, in response to the detecting, the peer DNAT table into a local DNAT table to obtain a merged DNAT table; and
  process an incoming packet using the merged DNAT table.

15. The network element of claim 14, wherein the NAT agent is further programmed to:
  re-establish a connection with the peer network element after the peer network element has rebooted; and
  provide, after the connection is established, the peer DNAT table to the peer network element.

16. The network element of claim 15, wherein the NAT agent is further programmed to:
  reconcile the merged DNAT table to obtain a new local DNAT table.

17. A non-transitory computer readable medium comprising computer readable program code, which when executed by a processor enables the processor to perform a method, the method comprising:
  maintaining, by a network element, a peer dynamic network address translation (DNAT) table associated with a peer network element;
  detecting that the peer network element has failed;
  merging, in response to the detecting, the peer DNAT table into a local DNAT table to obtain a merged DNAT table; and
  processing an incoming packet using the merged DNAT table.

18. The non-transitory computer readable medium of claim 17, wherein the method further comprises:
  re-establishing a connection the peer network element after the peer network element has rebooted; and
  providing, after the connection is established, the peer DNAT table to the peer network element.

19. The non-transitory computer readable medium of claim 18, wherein the method further comprises:
  reconciling the merged DNAT table to obtain a new local DNAT table.

20. The non-transitory computer readable medium of claim 17, wherein the method further comprises:
  the peer network element after re-initializing in response to a failure:
    re-establishing a connection with the network element; and
    recovering, after the connection is established, the peer DNAT table from the network element.

* * * * *